United States Patent
Ishibashi et al.

(10) Patent No.: US 6,606,396 B1
(45) Date of Patent: Aug. 12, 2003

(54) METHOD AND APPARATUS FOR DETECTING FORGERY

(75) Inventors: Toshiharu Ishibashi, Kariya (JP); Hirotoshi Nakamura, Nagoya (JP); Tadao Nojiri, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/559,179

(22) Filed: Apr. 27, 2000

(30) Foreign Application Priority Data

Jun. 18, 1999 (JP) .......................................... 11-173036

(51) Int. Cl.⁷ .............................................. G06K 19/06
(52) U.S. Cl. .......................... 382/112; 382/139; 283/72
(58) Field of Search ................................ 382/112, 135, 382/317, 139; 283/72, 85, 93, 113; 340/5.86; 356/71; 235/462.09, 462.11; 380/51

(56) References Cited

U.S. PATENT DOCUMENTS

| | | | |
|---|---|---|---|
| 5,371,798 A | * 12/1994 | McWhortor | 380/51 |
| 5,471,533 A | * 11/1995 | Wang et al. | 380/51 |
| 5,726,435 A | * 3/1998 | Hara et al. | 235/494 |
| 5,932,870 A | * 8/1999 | Berson | 235/494 |

FOREIGN PATENT DOCUMENTS

JP   10-232911   9/1998   ......... G06K/19/10

* cited by examiner

*Primary Examiner*—Brian Werner
*Assistant Examiner*—Ryan J. Miller
(74) *Attorney, Agent, or Firm*—Posz & Bethards, PLC

(57) ABSTRACT

A two-dimensional code and a predetermined figure pattern are printed on a medium. An error in the two-dimensional code is correctable during decoding of the two-dimensional code. A cell position corresponding to a position of the error is detectable. The predetermined figure pattern is made of special ink. The two-dimensional code and the predetermined figure pattern overlap each other at a specified place in the medium. The two-dimensional code is optically read from the medium. The two-dimensional code which has been optically read is decoded. In cases where error correction is executed during the decoding of the two-dimensional code, detection is given of an error correction position corresponding to a cell position having a related error. A determination is made as to whether or not the detected error correction position is in the specified place. Judging whether or not the medium is counterfeit is executed in response to a result of the determination.

11 Claims, 13 Drawing Sheets

PRIOR ART

[D1~D23 : DATA BLOCK "1"  D24~D46 : DATA BLOCK "2"]
[E1~E44 : RS BLOCK "1"  E45~E88 : RS BLOCK "2"]

METHOD AND APPARATUS FOR DETECTING FORGERY

BACKGROUND OF THE INVENTION

1. Field of the Invention

This invention relates to a method of detecting a forgery such as a counterfeit ticket or a forged ticket made by copying a genuine ticket. In addition, this invention relates to an apparatus for detecting a forgery. Furthermore, this invention relates to a recording medium which stores a signal representing a computer program for detecting a forgery.

2. Description of the Related Art

According to a known forgery detecting system, genuine tickets have prints using special ink such as magnetic ink which differs from toner employed in usual copying machines. Copying such a genuine ticket by a usual copying machine generates a forged ticket. The forged ticket has a picture portion which is a photo-copy of the special-ink-based print on the genuine ticket, but which is made of the toner rather than the special ink. The forged ticket can be discriminated from genuine tickets by a detecting device provided with a sensor for the special ink. The detecting device determines whether or not every subject ticket has the special ink. A subject ticket which has the special ink is concluded to be genuine. On the other, a subject ticket which lacks the special ink is concluded to be counterfeit.

A forged ticket which is made by the above-mentioned copying process is referred to as a first forged ticket. A second forged ticket can be made by sticking a special-ink-containing paper fragment on a first forged ticket. The detecting device in the known forgery detecting system fails to discriminate the second forged ticket from genuine tickets.

Japanese published unexamined patent application 10-232911 discloses a prepaid card on which a two-dimensional code is printed. The prepaid card in Japanese application 10-232911 can be provided with a hole or holes in the area of the two-dimensional code. The two-dimensional code represents first information. The position of the hole or the positions of the holes represent second information. After a virgin card is made, such a hole or holes can be provided at arbitrary positions of the card by a punching process. Therefore, the second information can be updated at any time.

Japanese application 10-232911 also discloses a system for discriminating an illegal card from a legitimate prepaid card. In the system of Japanese application 10-232911, prepaid cards have magnetic portions respectively. During the issue of every prepaid card, data representing an amount of money and data inherent to the card (card ID data) are shuffled into first encryption-resultant data, and the first encryption-resultant data are recorded on the magnetic portion thereof. In addition, the card ID data are encoded into second encryption-resultant data. A two-dimensional code representing the second encryption-resultant data is printed on the card by using invisible ink. Furthermore, a hole or holes are punched through the card in response to the first encryption-resultant data. Specifically, the position of the hole or the positions of the holes represent the first encryption-resultant data. The hole or holes are in the area of the two-dimensional code. The hole or holes may be located around the area of the two-dimensional code.

The system of Japanese application 10-232911 implements a card check process as follows. A signal is magnetically read out from the magnetic portion of a subject card. Signals are optically read out from the two-dimensional code and the hole or holes in the subject card. The signal read out from the magnetic portion is decoded into first money-amount data and first card ID data. The signal read out from the two-dimensional code is decoded into second card ID data. The signal read out from the hole or holes is decoded into second money-amount data and third card ID data. The first card ID data, the second card ID data, and the third card ID data are collated with each other. In addition, the first money-amount data and the second money-amount data are collated with each other. The results of these collations are used in deciding whether the subject card is legitimate or illegal.

SUMMARY OF THE INVENTION

It is a first object of this invention to provide an improved method of detecting a forgery.

It is a second object of this invention to provide an improved apparatus for detecting a forgery.

It is a third object of this invention to provide a recording medium which stores a signal representing an improved computer program for detecting a forgery.

A first aspect of this invention provides a method of determining whether or not a medium on which a two-dimensional code and a predetermined figure pattern are printed is counterfeit, wherein an error in the two-dimensional code is correctable during decoding of the two-dimensional code, and a cell position corresponding to a position of the error is detectable, the predetermined figure pattern being made of special ink, the two-dimensional code and the predetermined figure pattern overlapping each other at a specified place in the medium. The method comprises the steps of optically reading the two-dimensional code from the medium; decoding the two-dimensional code which has been optically read; in cases where error correction is executed during the decoding of the two-dimensional code, detecting an error correction position corresponding to a cell position having a related error; determining whether or not the detected error correction position is in the specified place; and judging whether or not the medium is counterfeit in response to a result of the determining.

A second aspect of this invention is based on the first aspect thereof, and provides a method wherein cells composing the two-dimensional code are grouped into blocks, and arrangement information representing arrangement of the cells in the blocks is recorded in the two-dimensional code and the error correction position is detected on the basis of the arrangement information.

A third aspect of this invention is based on the first aspect thereof, and provides a method wherein the error-correction-position detecting step comprises comparing a bright-dark cell pattern indicated by cells regenerated on the basis of results of the decoding of the two-dimensional code and information of a recording format of the two-dimensional code with a bright-dark cell pattern indicated by the optically-read two-dimensional code; and detecting the error correction position in response to a result of the comparing.

A fourth aspect of this invention is based on the first aspect thereof, and provides a method further comprising causing a sensor to scan the specified place, the sensor being able to sense the special ink; determining whether the special ink is present in or absent from the specified place in response to an output signal of the sensor; and concluding the medium to be counterfeit when it is determined that the special ink is absent from the specified place.

A fifth aspect of this invention provides an apparatus for determining whether or not a medium on which a two-dimensional code and a predetermined figure pattern are printed is counterfeit, wherein an error in the two-dimensional code is correctable during decoding of the two-dimensional code, and a cell position corresponding to a position of the error is detectable, the predetermined figure pattern being made of special ink, the two-dimensional code and the predetermined figure pattern overlapping each other at a specified place in the medium. The apparatus comprises reading means for optically reading bright-dark conditions of respective cells composing the two-dimensional code on the medium; decoding means for decoding the two-dimensional code on the basis of the optically-read bright-dark conditions of the cells; error-correction-position detecting means for, in cases where error correction is executed during the decoding of the two-dimensional code, detecting an error correction position corresponding to a cell position having a related error; determining means for determining whether or not the detected error correction position is in the specified place; and judging means for judging whether or not the medium is counterfeit in response to a result of the determining by the determining means.

A sixth aspect of this invention is based on the fifth aspect thereof, and provides an apparatus wherein cells composing the two-dimensional code are grouped into blocks, and arrangement information representing arrangement of the cells in the blocks is recorded in the two-dimensional code, and wherein the error-correction-position detecting means comprises means for detecting the error correction position on the basis of the arrangement information.

A seventh aspect of this invention is based on the fifth aspect thereof, and provides an apparatus wherein the error-correction-position detecting means comprises comparing means for comparing a bright-dark cell pattern indicated by cells regenerated on the basis of results of the decoding of the two-dimensional code and information of a recording format of the two-dimensional code with a bright-dark cell pattern indicated by the optically-read two-dimensional code; and detecting means for detecting the error correction position in response to a result of the comparing.

An eighth aspect of this invention is based on the fifth aspect thereof, and provides an apparatus further comprising at least one host and a plurality of terminals, wherein the reading means, the decoding means, and the error-correction-position detecting means are provided in the terminals, and wherein the determining means and the judging means are provided in the host, and the terminals inform the host of the error correction position.

A ninth aspect of this invention is based on the seventh aspect thereof, and provides an apparatus further comprising at least one host and a plurality of terminals, wherein the reading means and the decoding means are provided in the terminals, wherein the error-correction-position detecting means, the determining means, and the judging means are provided in the host, wherein the terminals notify the host of the results of the decoding and the information of the recording format of the two-dimensional code.

A tenth aspect of this invention is based on the fifth aspect thereof, and provides an apparatus further comprising a sensor for sensing the special ink; means for causing the sensor to scan the specified place; means for determining whether the special ink is present in or absent from the specified place in response to an output signal of the sensor; and means for concluding the medium to be counterfeit when it is determined that the special ink is absent from the specified place.

An eleventh aspect of this invention provides a recording medium loaded with a computer program corresponding to the method in one of the first to fourth aspects of this invention.

A twelfth aspect of this invention provides an apparatus comprising first means for capturing an image of a two-dimensional code on a subject, the two-dimensional code containing error correction information; second means for decoding the two-dimensional code in response to the image captured by the first means while correcting an error in the two-dimensional code in response to the error correction information and generating a signal representing a position of the error relative to an area of the two-dimensional code; and third means for determining whether the subject is genuine or counterfeit in response to the error position represented by the signal generated by the second means.

A thirteenth aspect of this invention provides an apparatus comprising first means for capturing an image of a two-dimensional code on a subject, the two-dimensional code containing error correction information; second means for decoding the two-dimensional code in response to the image captured by the first means while correcting an error in the two-dimensional code in response to the error correction information and generating a signal representing a position of the error relative to an area of the two-dimensional code; third means for determining whether or not the error position represented by the signal generated by the second means coincides with a specified position in the area of the two-dimensional code; fourth means for concluding the subject to be counterfeit when the third means determines that the error position coincides with the specified position; and fifth means for concluding the subject to be genuine when the third means determines that the error position does not coincide with the specified position.

DESCRIPTION OF THE PREFERRED EMBODIMENTS

First Embodiment

Figure 1:
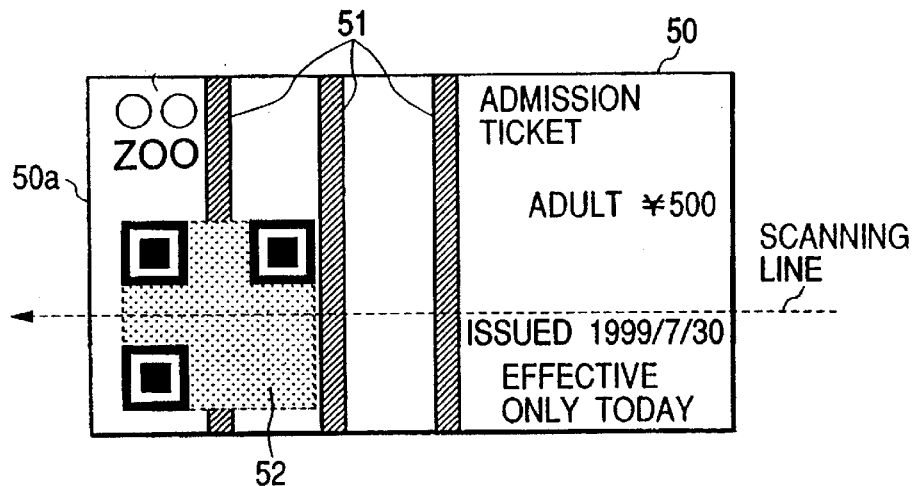
FIG. 1 is a diagrammatic plan view of a genuine admission ticket in a first embodiment of this invention.

As shown in FIG. 1, a genuine admission ticket 50 has a rectangular shape. Left-hand, central, and right-hand stripes 51 of invisible or transparent special ink are printed on central and left-hand areas of the main surface of the ticket 50. The stripes 51 are parallel with the shorter sides of the ticket 50. The stripes 51 are spaced at predetermined equal intervals. The width between the left-hand and right-hand stripes 51 is approximately equal to the length of the shorter sides of the ticket 50. The special ink used for the stripes 51 includes magnetic ink containing magnetic material. The stripes 51 can be detected by a special-ink sensing unit 30 which will be mentioned later. The stripes 51 are also referred to as the special-ink stripes 51. It should be noted that the special-ink stripes 51 are invisible or transparent although they are shown in FIG. 1 for a better understanding.

A two-dimensional code 52 is printed on a left-hand lower area of the main surface of the ticket 50. The two-dimensional code 52 is superimposed on a portion of the left-hand special-ink stripe 51. In other words, the area of the two-dimensional code 52 overlaps the portion of the left-hand special-ink stripe 51. The place where the area of the two-dimensional code 52 and the portion of the left-hand special-ink stripe 51 overlap each other is defined as a specified place or a specified position. The specified place (the specified position) is used in a forgery detecting process as will be mentioned later. The two-dimensional code 52 includes a QR (QUICK RESPONSE) code™ (hereafter "QR code"). Basically, the QR code is composed of cells corresponding to bits respectively.

Figure 2:
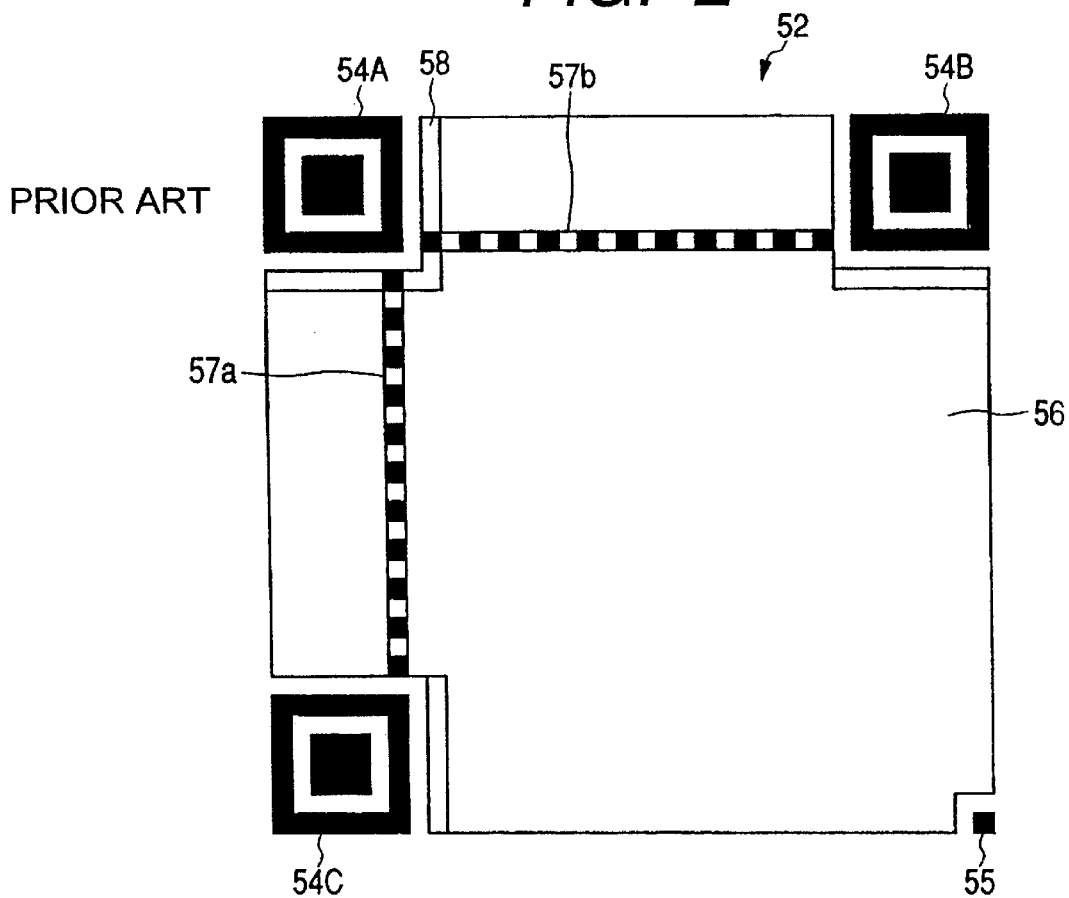
FIG. 2 is a diagrammatic plan view of a QR code.
Figure 3:
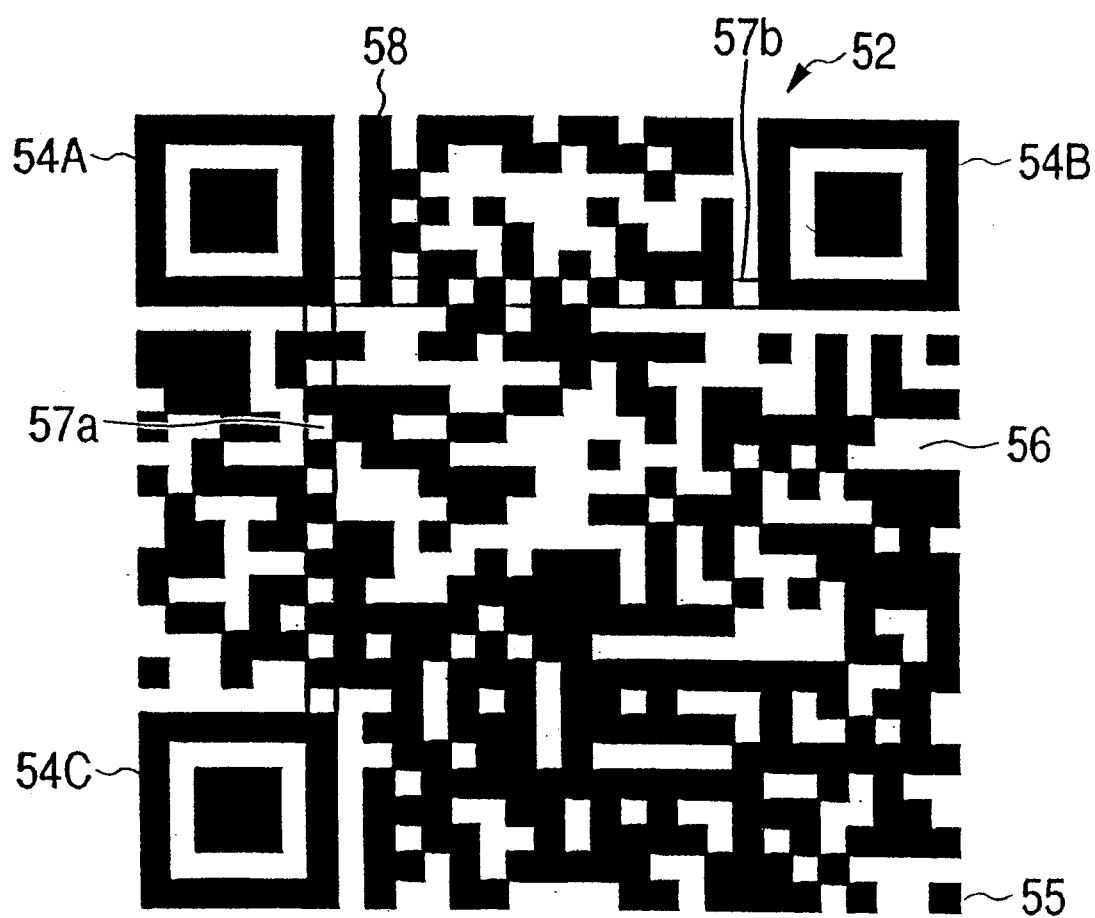
FIG. 3 is a diagrammatic plan view of the details of the QR code in FIG. 2.

As shown in FIGS. 2 and 3, the QR code 52 extends over a square area. The QR code 52 has three positioning symbols 54A, 54B, and 54C, a vertex detecting cell (an apex detecting cell) 55, a main information recording region 56, linear timing cell arrays 57a and 57b, and a format code 58. Each of the positioning symbols 54A, 54B, and 54C has a square shape. The positioning symbols 54A, 54B, and 54C, and the vertex detecting cell 55 are located at the corners of the code area, respectively. The linear timing cell array 57a extends between the positioning symbols 54A and 54C. The linear timing cell array 57b extends between the positioning symbols 54A and 54B. Each of the linear timing cell arrays 57a and 57b has a line of the alternation of white cells (bright cells) and black cells (dark cells). The format code 58 is located near the positioning symbol 54A. The format code 58 has a predetermined positional relation with the positioning symbol 54A. Specifically, the format code 58 has a shape extending parallel with a side of the square of the positioning symbol 54A which opposes the positioning symbol 54B. In addition, the format code 58 is spaced from that side of the square of the positioning symbol 54A by an interval corresponding to one cell. It should be noted that FIGS. 2 and 3 are diagrams, and the number of cells in each of the linear timing cell arrays 57a and 57b in FIG. 2 differs from that in FIG. 3. The main information recording region 56 has a two-dimensional pattern of white cells (bright cells) and black cells (dark cells) as shown in FIG. 3. It should be noted that the illustration of a white-black pattern (a bright-dark pattern) in the main information recording region is omitted from FIG. 2 for clarity.

As previously mentioned, the three positioning symbols 54A, 54B, and 54C are located at the three corners of the code area, respectively. Each of the positioning symbols 54A, 54B, and 54C is divided into an outermost zone, an intermediate zone, and an innermost zone (a central zone). The outermost zone is a square black loop having a width corresponding to one cell. The intermediate zone is a square white loop having a width corresponding to one cell. The intermediate zone extends between the outermost zone and the innermost zone. The innermost zone is a black square having a size of 3 cells by 3 cells. Accordingly, regarding each of the positioning symbols 54A, 54B, and 54C, the ratio in length among the bright and dark portions is fixed to a predetermined ratio as "1 (dark): 1 (bright): 3 (dark): 1 (bright): 1 (dark)" independent of the scanning direction. Thus, the positioning symbols 54A, 54B, and 54C can be detected by sensing the predetermined ratio in length among bright and dark portions.

The vertex detecting cell 55 is located at the remaining corner of the code area. The vertex detecting cell 55 consists of a black cell.

As previously mentioned, the linear timing cell arrays 57a and 57b extend among the positioning symbols 54A, 54B, and 54C. The white-black patterns (bright-dark patterns) in the linear timing cell arrays 57a and 57b are references indicating the positions of data cells in the main information recording region 56.

As previously mentioned, the format code 58 is located near the positioning symbol 54A. The format code 58 represents preset information representing a version related to a format (a recording format) of data stored in the main information recording area 56. The preset information is also referred to as the version information. The version information is formed by a combination of a first information piece and a second information piece. The first information piece can be changed among different states assigned to eight different versions "1", "2", . . . , "7", and "8" respectively. The second information piece can be changed among different states assigned to four different error correction levels "L", "M", "Q", and "H" respectively. Accordingly, the version information is expressed as "3-L", "5-H", etc.

Figure 4:
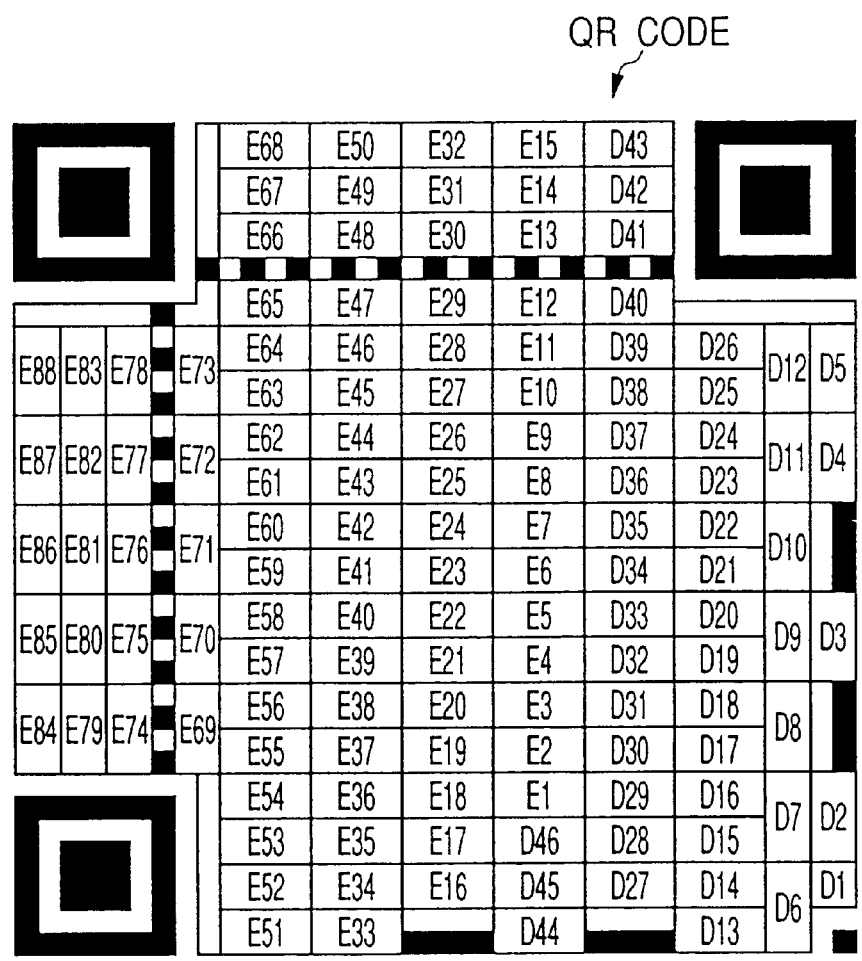
FIG. 4 is a diagram of code words in a main information recording region of a QR code.

The versions "1", "2", . . . , "7", and "8" correspond to different total numbers of code words, respectively. Each code word has 8 bits. Since one bit corresponds to one cell, each code word is formed by a group of 8 cells. In FIG. 4, D1–D46 and E1–E88 denote code words respectively. Specifically, D1–D46 denote data code words respectively while E1–E88 denote error correction code words respectively. An error correction code uses a Reed-Solomon code (an RS code). Thus, the error correction code words are also referred to as the RS code words. The QR code in FIG. 4 corresponds to the version "4". According to the version "4", there are 46 data code words and 88 RS code words. Thus, the total number of code words is equal to 134 (46+88).

The data code words D1–D46 and the RS code words E1–E88 are in an array having columns and rows. The data code words D1–D46 and the RS code words E1–E88 are sequentially arranged in the decoding order. Specifically, decoding is started from the code word D1. After decoding the code word D46 has been completed, decoding the RS code word E1 is started. Decoding is ended at the RS code word E88. In FIG. 4, decoding proceeds upward along each column, and the column which is being decoded moves from right to left.

The first code word D1 has only 4 bits. During error correction, 4 bits of "0" are added to the head of a recovered code word D1 so that the code word D1 is handled as a set of 8 bits. Each of the other code words D2–D46 and E1–E88 has 8 bits. Thus, each of the code words D2–D46 and E1–E88 is represented by 8 cells.

The data code words D1–D23 compose a data block "1". The data code words D24–D46 compose a data block "2". The RS code words E1–E44 compose an RS block "1". The RS code words E45–E88 compose an RS block "2". Accordingly, the main information recording region 56 is divided into four zones assigned to the data blocks "1" and "2" and the RS blocks "1" and "2" respectively.

Each of the error correction levels "L", "M", "Q", and "H" prescribes the total number of RS code words, the total number of RS blocks, or the total number of data code words. The QR code in FIG. 4 corresponds to the version information "5-H" which means that the total number of RS code words is equal to 88 and the total number of RS blocks is equal to 2. As previously indicated, the total number of code words is equal to 134 according to the version "5". Therefore, in the QR code of FIG. 4, there are two sets each having one data block of 23 data code words and one RS block of 44 RS code words.

Each of the version information "5-L", the version information "5-M", and the version information "5-Q" indicates the existence of only one RS block.

Regarding the error correction levels "L", "M", "Q", and "H", the ability to correct errors decreases in the order as "H"→"Q"→"M"→"L". Error correction enables original data to be recovered even if some of code words are damaged. An allowable damage rate is defined as a maximum damaged-code-word percentage at which original data can be recovered. The error correction level "H" corresponds to an allowable damage rate of about 30%. The error correction level "Q" corresponds to an allowable damage rate of about 25%. The error correction level "M" corresponds to an allowable damage rate of about 20%. The error correction level "L" corresponds to an allowable damage rate of about 15%.

A signal representing a table indicative of the correspondence relation between such version information and the contents thereof (the total number of code words, the total number of RS code words, and the ability to correct errors) is stored in a RAM within a control portion 11 of an optical information reading unit 10 of a reading apparatus 1 which will be explained later.

Codes referred to as indicators are recorded on predetermined positions within the code words D1–D44 and E1–E88 in FIG. 4. Each indicator is a recording-format indicating code defining what is meant by a recorded bit sequence. For example, the indicator has 4 bits. The indicator being "0001" means that a recorded bit sequence indicates numerals. The indicator "0010" means that a recorded bit sequence indicates alphanumeric characters. The indicator being "1000" means that a recorded bit sequence indicates Chinese characters. Specifically, each indicator defines a recording format of a data portion between the indicator and a next indicator.

Figure 5:
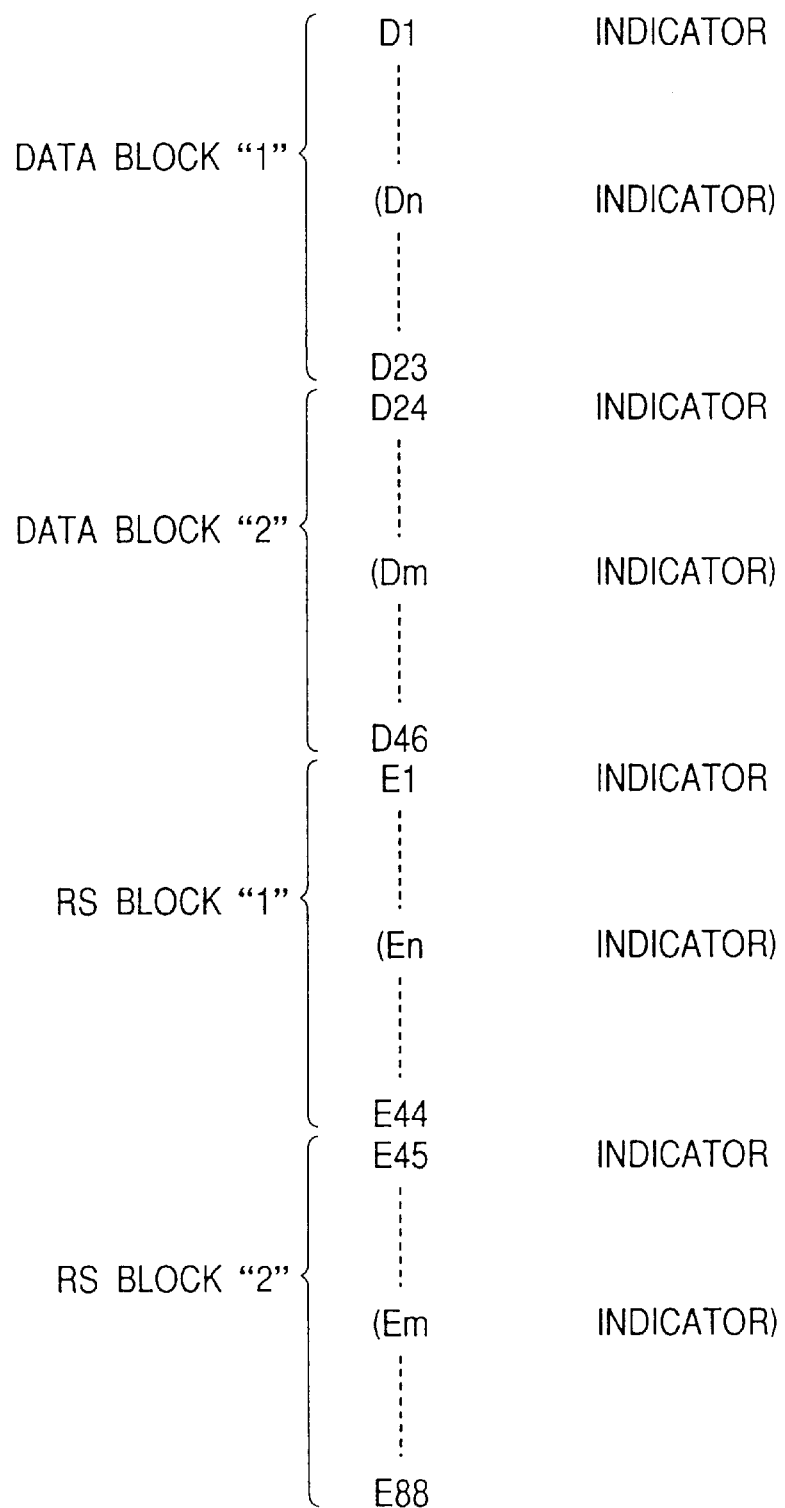
FIG. 5 is a diagram of code words, data blocks, RS blocks, and indicators in a main information recording region of a QR code.

As shown in FIG. 5, indicators are recorded on first code words in blocks, respectively. Specifically, indicators are recorded on the first data code word D1 in the data block "1", the first data code word D24 in the data block "2", the first RS code word E1 in the RS block "1", and the first RS code word E45 in the RS block "2". In addition, indicators may be recorded on the code words Dn, Dm, En, and Em, each of which corresponds to the boundary between data portions of different recording formats.

As shown in FIG. 1, various information pieces represented by characters are provided on the main surface of the ticket 50. The information pieces indicate the name of a park, the discrimination between adult and child, a charge, and the date of issue.

Figure 6:
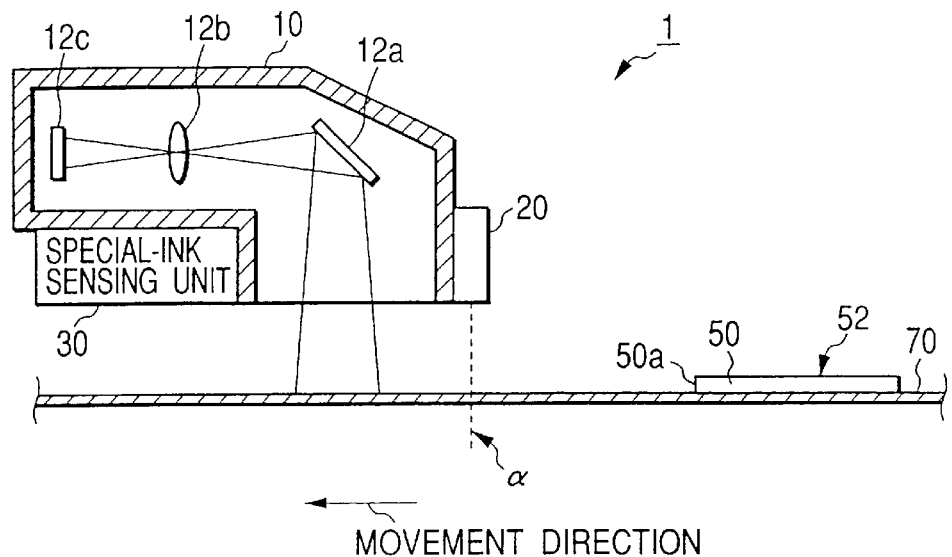
FIG. 6 is a sectional diagram of a reading apparatus according to the first embodiment of this invention.

With reference to FIG. 6, a reading apparatus 1 is of a fixed type. The reading apparatus 1 operates for each ticket to be checked. As shown in FIG. 6, a belt conveyor 70 carries an admission ticket 50. The ticket 50 is placed on the belt conveyor 70 in a manner such that the main surface of the ticket 50 faces upward. The reading apparatus 1 reads out information pieces from the upper surface (the main surface) of the ticket 50. The reading apparatus 1 determines whether the ticket 50 is genuine or counterfeit on the basis of the read-out information pieces.

The reading apparatus 1 includes an optical information reading unit 10, a ticket sensing unit 20, and a special-ink sensing unit 30 which are fixed to each other and are combined into a single body. The ticket sensing unit 20 is upstream of the optical information reading unit 10 with respect to the direction of travel of the belt conveyor 70. The special-ink sensing unit 30 is downstream of an opening in the optical information reading unit 10 with respect to the direction of travel of the belt conveyor 70.

The ticket sensing unit 20 includes a light emitter and a photosensor. The ticket sensing unit 20 emits forward visible light in a downward direction. The ticket sensing unit 20 has the function of detecting return light which results from reflection of the forward light. The ticket sensing unit 20 outputs a signal to the optical information reading unit 10 which represents whether or not return light is detected. Preferably, the upper surfaces of the belt conveyor 70 have a predetermined color different from a color of the main surface (the upper surface) of the ticket 50. The tone of the upper surfaces of the belt conveyor 70 may be different from that of the main surface of the ticket 50. The colors or the tones of the upper surfaces of the belt conveyor 70 and the main surface (the upper surface) of the ticket 50 are designed to provide the following processes. The forward light emitted from the ticket sensing unit 20 is absorbed by the upper surfaces of the belt conveyor 70 while being hardly reflected thereat. Thus, sensible return light does not occur when the forward light meets the upper surfaces of the belt conveyor 70. On the other hand, the forward light is efficiently reflected at the upper surface (the main surface) of the ticket 50. Thus, sensible return light occurs when the forward light meets the upper surface of the ticket 50. Specifically, when the ticket 50 on the belt conveyor 70 reaches a predetermined position relative to the ticket sensing unit 20, return light appears which is sensed by the ticket sensing unit 20. In more detail, when the front edge 50a of the ticket 50 reaches a predetermined position "α", return light appears which is sensed by the ticket sensing unit 20.

Figure 7:
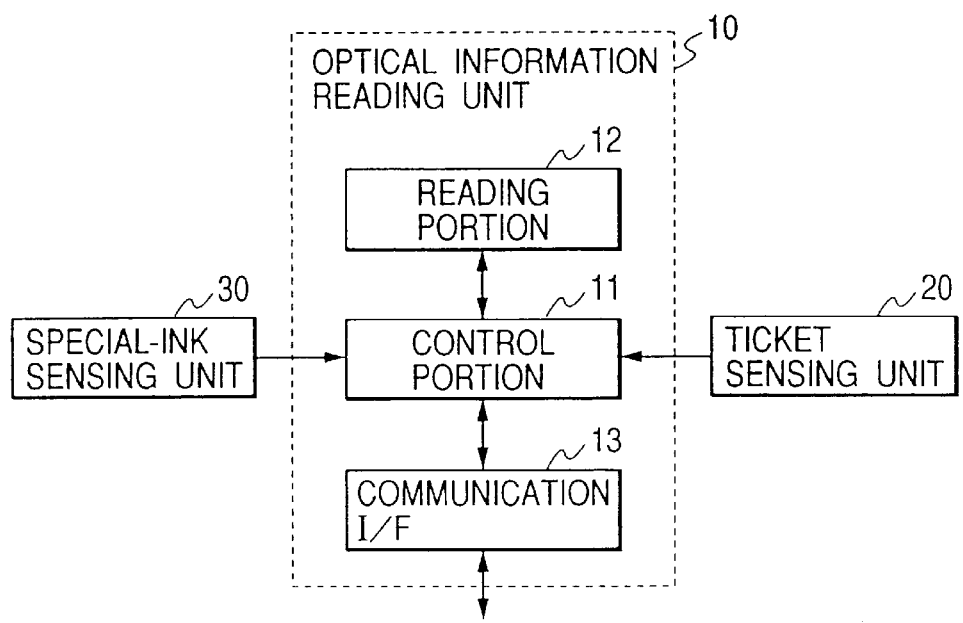
FIG. 7 is a block diagram of the reading apparatus in FIG. 6.

As shown in FIG. 7, the optical information reading unit 10 includes a control portion 11, a reading portion 12, and a communication interface (I/F) 13. The control portion 11 is connected to the reading portion 12, the communication interface 13, the ticket sensing unit 20, and the special-ink sensing unit 30.

The control portion 11 includes a computer having a combination of a CPU, a ROM, a RAM, and an I/O port. The control portion 11 operates in accordance with a program stored in the ROM. The program may be stored in the RAM.

The control portion 11 receives output signals from the ticket sensing unit 20 and the special-ink sensing unit 30. According to the program, the control portion 11 controls the reading portion 12 in response to the output signal from the ticket sensing unit 20 to capture an image of a two-dimensional code on the upper surface (the main surface) of an admission ticket 50 carried by the belt conveyor 70. In addition, the control portion 11 determines whether the ticket 50 is genuine or counterfeit on the basis of the captured image and the output signal from the special-ink sensing unit 30. Furthermore, the control portion 11 executes a process responsive to the result of the determination.

The reading portion 12 includes a mirror 12a, a lens 12b, and a CCD area sensor or a CCD image sensor 12c (see FIG. 6). The reading portion 12 further includes light emitting diodes (LED's) for illumination, an amplifier circuit, a binarizing circuit, an address generation circuit, and a memory.

The illumination LED's within the reading portion 12 apply red illumination light (forward reading light) to a region containing a QR code 52 on the upper surface of an admission ticket 50 in response to a command signal fed from the control portion 11. The illumination light is reflected at the region, causing return light. The return light propagates from the upper surface of the ticket 50 to the mirror 12a via the opening in the optical information reading unit 10. The return light is reflected by the mirror 12a toward the lens 12b, and then passes through the lens 12b. The return light is focused on the CCD area sensor 12c by the lens 12b. When the QR code 52 on the upper surface of the ticket 50 is in the field of the view of the CCD area sensor 12c, an image of the QR code 52 is formed on the CCD area sensor 12c. The CCD area sensor 12c thus receives the return light from the region containing the QR code 52, and converts the received light into an electric signal representing a two-dimensional 1-frame image of that region. The electric signal is of a predetermined line-by-line scanning format. The CCD area sensor 12c outputs the electric signal to the amplifier circuit within the reading portion 12. The amplifier circuit amplifies the output signal of the CCD area sensor 12c, and outputs the amplification-resultant signal to the binarizing circuit within the reading portion 12. The binarizing circuit converts the output signal of the amplifier circuit into a binary signal or a two-value signal. The binarizing circuit outputs the binary signal to the memory within the reading portion 12. The binary signal is stored into the memory as digital two-value data (digital image data) representing the 1-frame image of the region containing the QR code 52. In this way, an image containing an image of the QR code 52 is captured. The address generation circuit within the reading portion 12 outputs an address signal to the memory which designates the place of a memory segment to be loaded with a piece of the digital image data. The writing of the digital image data into the memory is implemented 8 bits by 8 bits. Specifically, 8-bit pieces of the digital image data are sequentially written into different storage segments in the memory in response to the address signal. The digital image data are processed, and the QR code 52 is decoded in a conventional way to recover information represented by the QR code 52.

The communication interface 13 implements communications with an external apparatus (not shown). Specifically, the communication interface 13 transmits data to the external apparatus via a light emitter. Furthermore, the communication interface 13 receives signals from the external apparatus via a light receiver.

The special-ink sensing unit 30 includes a magnetic-ink reading device having a fixed magnetic head. In the case where an admission ticket 50 is carried by the belt conveyor 70 at a constant speed, the ticket 50 passes through a region below the magnetic head while being scanned thereby. The magnetic head senses a magnetic flux. The special-ink sensing unit 30 detects a variation in the sensed magnetic flux from an output signal of the magnetic head. The special-ink sensing unit 30 senses the special-ink stripes 51 on the ticket 50 in response to the detected magnetic-flux variation. It should be noted that the stripes 51 are made of the special ink including the magnetic ink.

Figure 8:
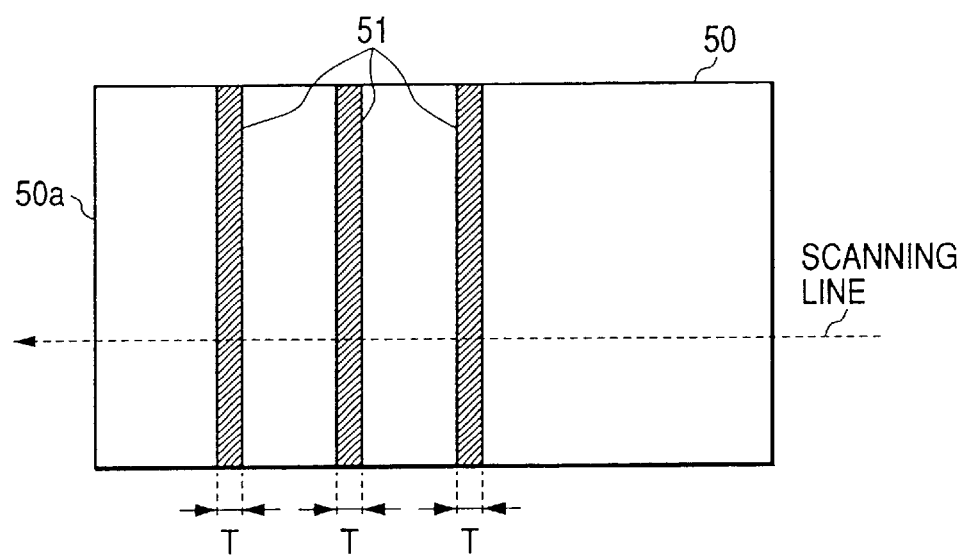
FIG. 8 is a diagrammatic plan view of a genuine admission ticket, special-ink stripes provided thereon, and a scanning line.
Figure 9:
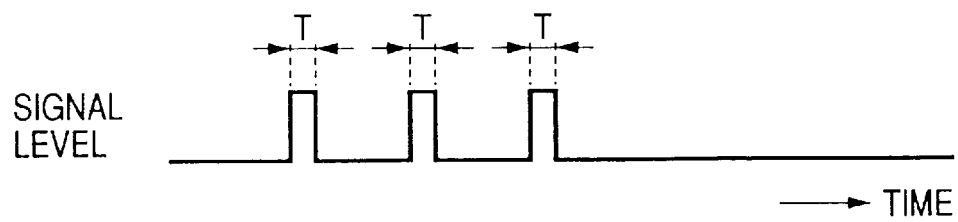
FIG. 9 is a time-domain diagram of an output signal from a special-ink sensing unit in FIGS. 6 and 7.

As shown in FIGS. 1 and 8, a line along which the ticket 50 is scanned by the magnetic head of the special-ink sensing unit 30 extends perpendicular to the special-ink stripes 51 on the ticket 50. The special-ink sensing unit 30 generates a magnetic-flux-indicating signal which changes as follows. With reference to FIGS. 8 and 9, during each time range T for which one of the special-ink stripes 51 continues to be scanned by the magnetic head, the level of the magnetic-flux-indicating signal remains high. During other time ranges, the level of the magnetic-flux-indicating signal remains low. Thus, during the scanning of the ticket 50 by the special-ink sensing unit 30, the level of the magnetic-flux-indicating signal varies in accordance with the figure pattern formed by the special-ink stripes 51. The special-ink sensing unit 30 outputs the magnetic-flux-indicating signal to the control portion 11. The magnetic-flux-indicating signal is also referred to as the figure-pattern-corresponding signal.

Figure 10:
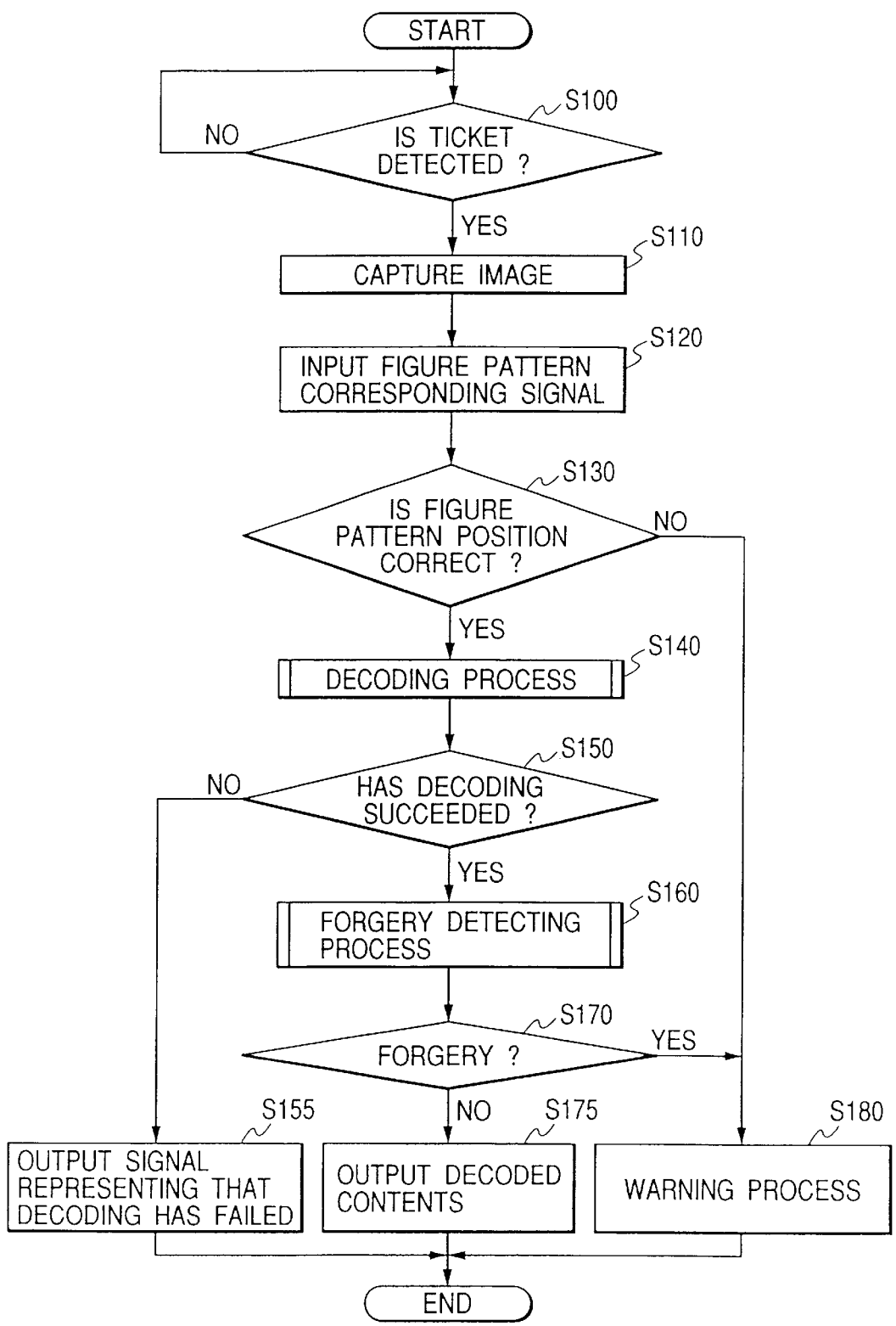
FIG. 10 is a flowchart of a segment of a program for a control portion in FIG. 7.

As previously mentioned, the control portion 11 operates in accordance with a program. FIG. 10 is a flowchart of a segment (a main routine) of the program which relates to a reading process. The program segment in FIG. 10 is iteratively executed. Specifically, the program segment in FIG. 10 is executed for each ticket to be checked.

As shown in FIG. 10, a first step S100 of the program segment determines whether or not the front edge of a subject ticket reaches the position "α" on the basis of the output signal of the ticket sensing unit 20. When the step S100 determines that the front edge of the subject ticket reaches the position "α", the program advances from the step S100 to a step S110. Otherwise, the step S100 is repeated.

The step S110 commands the reading portion 12 to capture or input an image at a timing determined on the basis of the output signal from the ticket sensing unit 20. Therefore, digital image data are stored into the memory within the reading portion 12. In the case where a QR code is provided on the upper surface of the subject ticket, the captured image contains an image of the QR code.

A step S120 following the step S110 receives the figure-pattern-corresponding signal from the special-ink sensing unit 30 at a predetermined timing after the step S100 determines that the front edge of the subject ticket reaches the position "α".

Observations of a change in the level of the figure-pattern-corresponding signal makes it possible to determine whether or not special-ink stripes are provided on predetermined positions of the subject ticket.

A step S130 subsequent to the step S120 judges whether or not the change in the level of the figure-pattern-corresponding signal agrees with a normal change. The judgment by the step S130 is to determine whether or not special-ink stripes are provided on the predetermined positions of the subject ticket. When the step S130 judges that the change in the level of the figure-pattern-corresponding signal agrees with the normal change, that is, when the step S130 determines that special-ink stripes are provided on the predetermined positions of the subject ticket, the program advances from the step S130 to a subroutine S140. On the other hand, when the step S130 judges that the change in the level of the figure-pattern-corresponding signal disagrees with the normal change, that is, when the step S130 determines that special-ink stripes are not provided on the predetermined positions of the subject ticket, the program advances from the step S130 to a step S180. In this case, the step S130 concludes the subject ticket to be counterfeit.

The subroutine S140 accesses the digital image data in the memory within the reading portion 12, and implements a decoding process on the digital image data.

A step S150 following the step S140 determines whether or not the decoding process by the subroutine S140 has succeeded. When the step S150 determines that the decoding process has succeeded, the program advances from the step S150 to a subroutine S160. Otherwise, the program advances from the step S150 to a step S155.

The step S155 outputs a signal representing that the decoding process by the subroutine S140 has failed. After the step S155, the current execution cycle of the program segment ends.

The subroutine S160 executes a process of determining whether the subject ticket is genuine or counterfeit.

A step S170 subsequent to the subroutine S160 inspects the result of the process by the subroutine S160 to confirm whether or not the subject ticket is counterfeit. When the step S170 confirms that the subject ticket is counterfeit, the program advances from the step S170 to the step S180. Otherwise, the program advances from the step S170 to a step S175.

The step S175 outputs the contents, which have been recovered by the decoding process in the subroutine S140, to an external management apparatus (not shown) via the communication interface 13. The management apparatus opens an admission gate in response to the contents outputted by the step S175. After the step S175, the current execution cycle of the program segment ends.

The step S180 outputs a warning signal to the management apparatus via the communication interface 13. The management apparatus holds the admission gate closed and activates a buzzer in response to the warning signal to notify a clerk in charge that the subject ticket is counterfeit. After the step S180, the current execution cycle of the program segment ends.

Figure 11:
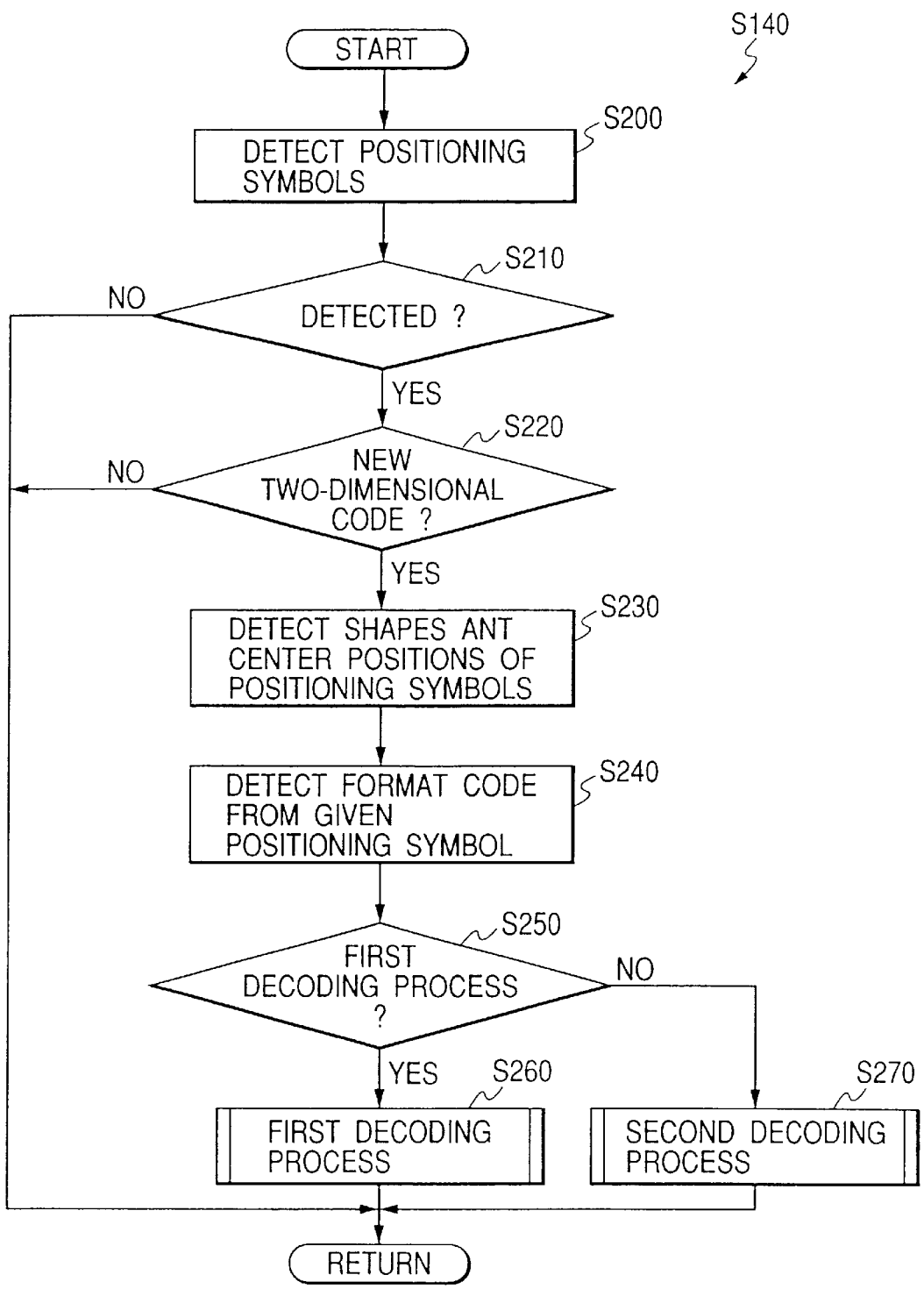
FIG. 11 is a flowchart of a first subroutine in FIG. 10.

As shown in FIG. 11, the subroutine S140 includes a step S200 which follows the step S130 (see FIG. 10). The step S200 detects QR-code positioning symbols represented by the digital image data in the memory within the reading portion 12. The step S200 decides the positions of the centers of the detected positioning symbols, and the shapes of the detected positioning symbols in the QR-code image. The step S200 determines whether or not three positioning symbols are in correct positions relative to the QR-code area or the QR-code image on the basis of the decided symbol center positions and the decided symbol shapes.

In more detail, the step S200 determines whether or not addresses related to the positioning symbols represented by the digital image data in the memory within the reading portion 12 are separated into three groups positionally corresponding to three corners of the QR-code area (the QR-code image). The step S200 decides the positions of the centers of the positioning symbols, and the shapes of the positioning symbols on the basis of a 1/0 pattern (a white-black pattern or a bright-dark pattern) represented by the digital image data. The step S200 determines whether or not three positioning symbols are in corners of the QR-code area (the QR-code image) on the basis of the results of the previous determination and the decision.

A step S210 subsequent to the step S200 determines whether or not correct positioning symbols 54A, 54B, and 54C have been detected by the step S200. When the step S210 determines that correct positioning symbols 54A, 54B, and 54C have been detected, the program advances from the step S210 to a step S220. Otherwise, the program exits from the step S210, and then proceeds to the step S150 (see FIG. 10).

The step S220 determines whether or not a QR code 52 having the detected positioning symbols 54A, 54B, and 54C is new. When the step S220 determines that the QR code 52 is new, the program advances from the step S220 to a step S230. Otherwise, the program exits from the step S220, and then proceeds to the step S150 (see FIG. 10). In the case where correct positioning symbols 54A, 54B, and 54C have been detected and the contents of a related QR code have been read, the QR code is determined to be not new. The determination by the step S220 is to prevent a same QR code from being recognized as separate QR codes.

The step S230 calculates the positions of the centers of the positioning symbols 54A, 54B, and 54C on the basis of the shapes of the positioning symbols 54A, 54B, and 54C. In addition, the step S230 calculates the shapes of cells composing the positioning symbols 54A, 54B, and 54C.

A step S240 following the step S230 detects a format code 58 on the basis of the positioning symbol 54A by referring to the predetermined positional relation between the format code 58 and the positioning symbol 54A.

A step S250 subsequent to the step S240 determines whether or not a mode of processing which is set agrees with a first decoding process. When the step S250 determines that the mode of processing agrees with the first decoding process, the program advances from the step S250 to a subroutine S260. Otherwise, the program advances from the step S250 to a subroutine S270.

The reading apparatus 1 (see FIG. 6) is provided with a switch which can be operated by a user. Operating the switch can change the set mode of processing between the first decoding process and a second decoding process (mentioned later). The step S250 executes the determination by referring to the state of the switch or the output signal from the switch.

The subroutine S260 executes the first decoding process. During the first decoding process, decoding the whole of a main information recording region 56 in the QR code 52 is tried. Decoding the whole of a main information recording region 56 is referred to as a whole decoding process. Only if the whole decoding process fails, a partial decoding process on a block-by-block basis is carried out. After the subroutine S260, the program advances to the step S150 (see FIG. 10).

The subroutine S270 executes a second decoding process which has only the partial decoding process. Thus, during the second decoding process, the whole decoding process is not executed. After the subroutine S270, the program advances to the step S150 (see FIG. 10).

Figure 12:
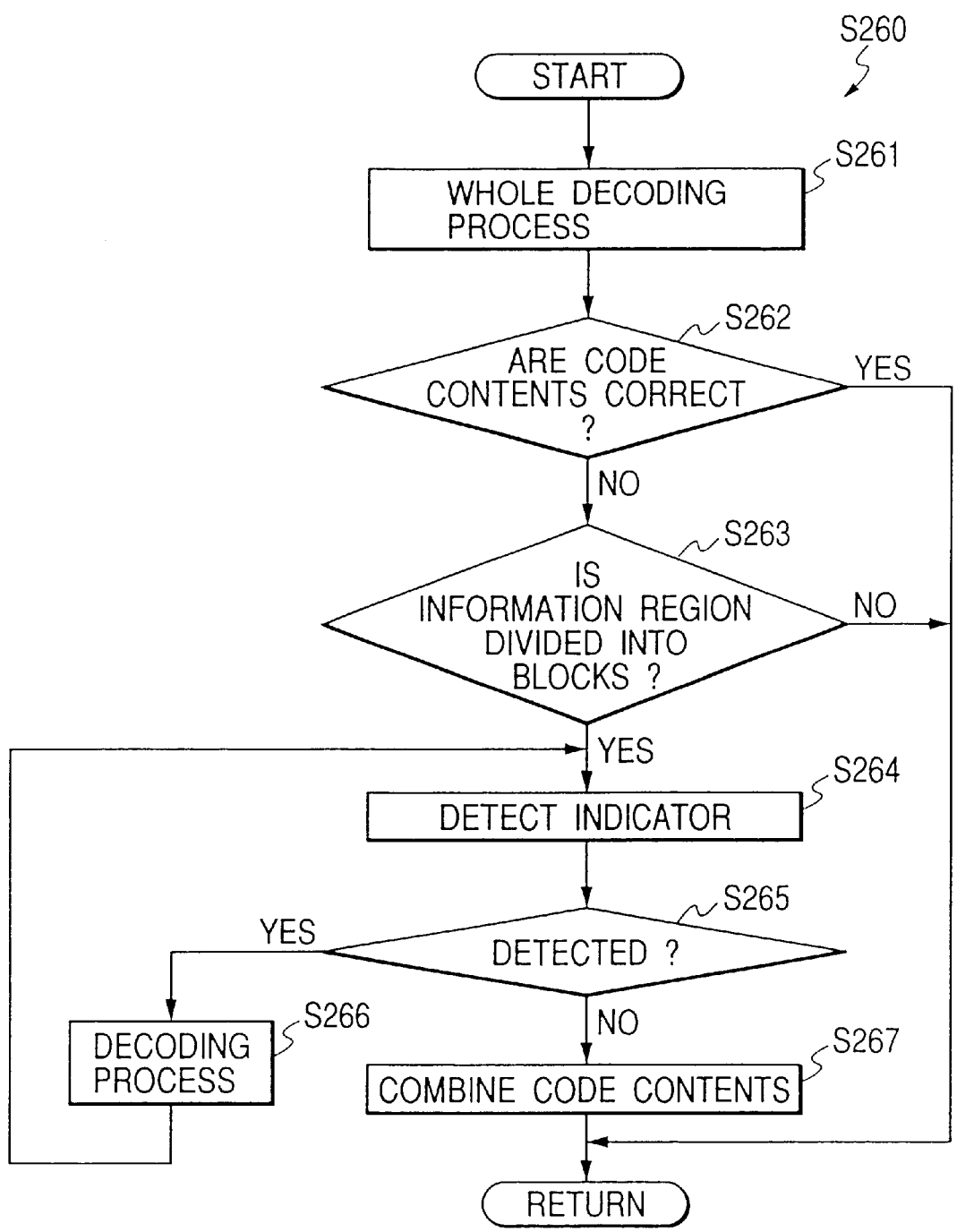
FIG. 12 is a flowchart of a first portion in FIG. 11.

As shown in FIG. 12, the subroutine S260 includes a step S261 which follows the step S250 (see FIG. 11). The step S261 executes the whole decoding process. Specifically, the step S261 detects the main information recording region 56 in the QR code 52 which corresponds to the version represented by the format code 58 detected by the step S240 (see FIG. 11). Since cells (data cells) composing the main information recording region 56 have equal predetermined sizes, the size of the region 56 can be found. Then, the positions of the centers of the data cells are calculated on the basis of the positions of the centers of the positioning symbols 54A, 54B, and 54C which are determined by the step S230 (see FIG. 11) and the shapes of the positioning symbols 54A, 54B, and 54C. Subsequently, the signal values of pixels at the centers of the data cells are read out, and the contents of all code words in the main information recording region 56 are recovered on the basis of the read-out pixel signal values. Thus, all the code words in the main information recording region 56 are decoded.

As shown in FIG. 4, the areas of code words are of a horizontally elongated type and a vertically elongated type. The step S261 derives format information from the format code 58. The format information indicates the assignment of groups of cells to code words. The step S261 executes the decoding of the code words on the basis of the format information. The step S261 implements an error correction process in response to RS code words. In the presence of an error or errors, the error correction process generates information representing the position of the error or the positions of the errors.

A step S262 following the step S261 determines whether or not the recovered contents (the decoding results) generated by the step S261 are correct. The error correction process by the step S261 enables the correct recovery of contents in the case where the rate of errors is equal to or less than the allowable damage rate. On the other hand, it is difficult to correctly recover contents in the case where the rate of errors is greater than the allowable damage rate. Preferably, the determination by the step S262 is executed according to the relation between the rate of errors and the allowable damage rate. When the step S262 determines that the recovered contents are correct, the program exits from the step S262 and then proceeds to the step S150 (see FIG. 10). Otherwise, the program advances from the step S262 to a step S263.

The step S263 determines whether or not the main information recording region 56 is divided into a plurality of blocks (data blocks and RS blocks). When the step S263 determines that the main information recording region 56 is divided into a plurality of blocks, the program advances from the step S263 to a step S264. Otherwise, the program exits from the step S263, and then proceeds to the step S150 (see FIG. 10).

The step S264 searches the code words D1–D46 and E1–E88 for an indicator in the decoding order. Thus, the step S264 detects an indicator.

A step S265 subsequent to the step S264 determines whether or not an indicator has been detected by the step S264. When the step S265 determines that an indicator has been detected by the step S264, the program advances from the step S265 to a step S266. Otherwise, the program advances from the step S265 to a step S267.

The step S266 subjects a block containing the detected indicator to a decoding process in accordance with the recording format defined by the detected indicator. Thus, the step S266 executes a partial decoding process. Preferably, the step S266 implements an error correction process which generates information representing the position of an error or the positions of errors. After the step S266, the program returns to the step S264 to detect a next indicator. Accordingly, in the case where indicators are successively detected by the step S264, blocks containing the respective detected indicators are sequentially decoded by the step S266. When the step S264 does not detect a further indicator, the program advances from the step S264 to the step S267 via the step S265.

The step S267 combines the recovered contents of the respective blocks. The step S267 may combine the recovered contents of specified ones of the blocks. It should be noted that the step S267 may be omitted. After the step S267, the program advances to the step S150 (see FIG. 10).

Figure 13:
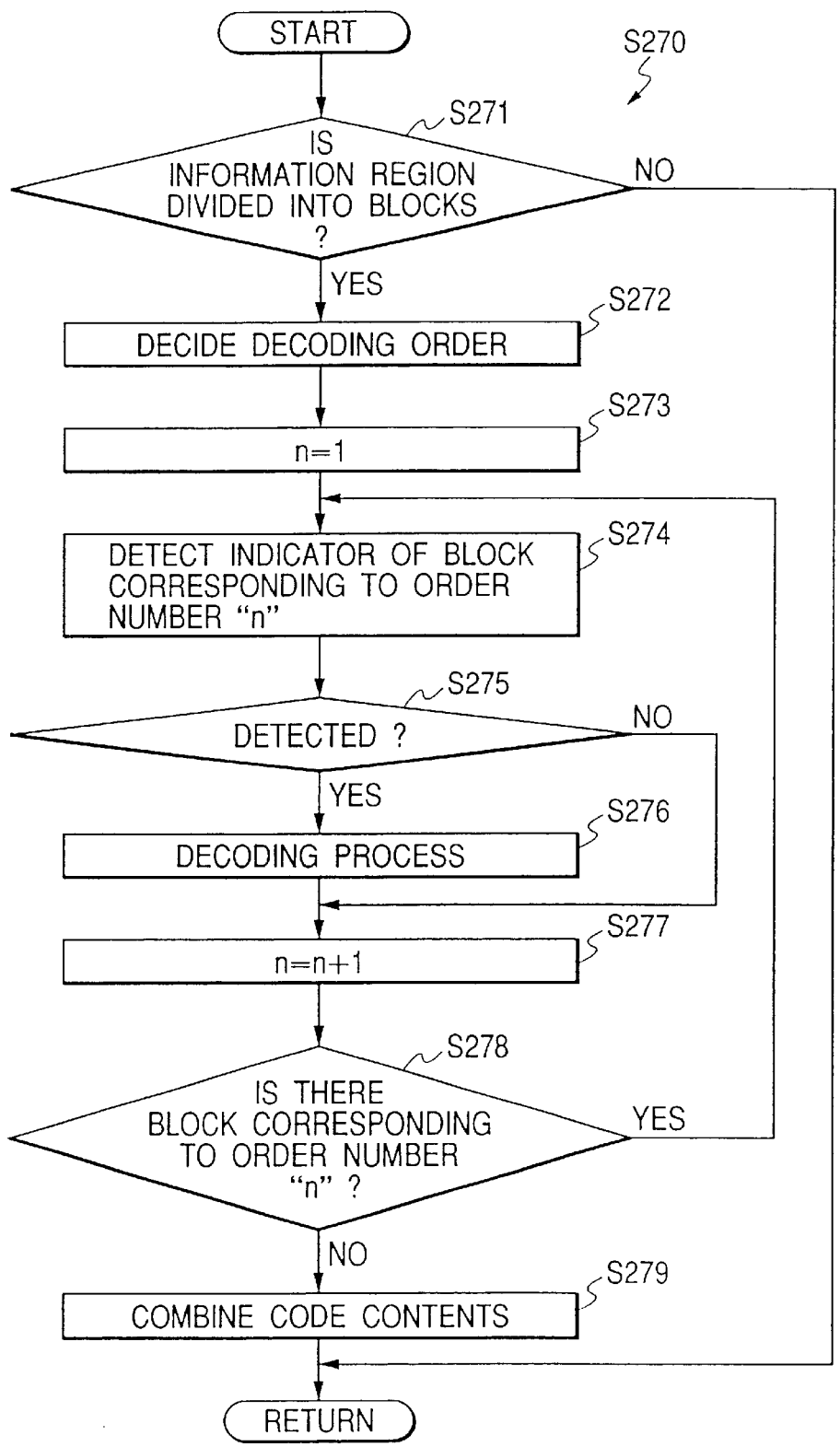
FIG. 13 is a flowchart of a second portion in FIG. 11.

As shown in FIG. 13, the subroutine S270 includes a step S271 which follows the step S250 (see FIG. 11). The step S271 determines whether or not the main information recording region 56 is divided into a plurality of blocks (data blocks and RS blocks). When the step S271 determines that the main information recording region 56 is divided into a plurality of blocks, the program advances from the step S271 to a step S272. Otherwise, the program exits from the step S271, and then proceeds to the step S150 (see FIG. 10).

The step S272 determines a block decoding order. The step S272 derives the version information from the format code 58. The step S272 recognizes the number of blocks and the positions of the blocks in the main information recording region 56 from the version information. The step S272 determines the block decoding order in response to the number of the blocks and the positions of the blocks. For example, the determined block decoding order is data block "1"→data block "2"→RS block "1"→RS block "2".

A step S273 following the step S272 sets or initializes an order number "n" to "1". The blocks are identified by different order numbers "n" respectively. After the step S273, the program advances to a step S274.

The step S274 detects an indicator in the block corresponding to the order number "n".

A step S275 subsequent to the step S274 determines whether or not an indicator has been detected by the step S274. When the step S275 determines that an indicator has been detected, the program advances from the step S275 to a step S276. Otherwise, the program jumps from the step S275 to a step S277.

The step S276 subjects the data block containing the detected indicator to a decoding process in accordance with the recording format defined by the detected indicator. Thus, the step S276 executes a partial decoding process. Preferably, the step S276 implements an error correction process which generates information representing the position of an error or the positions of errors. After the step S276, the program advances to the step S277.

The step S277 increments the order number "n" by "1" according to the statement as "n=n+1".

A step S278 subsequent to the step S277 determines whether or not there is a block corresponding to the order number "n". When the step S278 determines that there is a block corresponding to the order number "n", the program returns from the step S278 to the step S274. Otherwise, the program advances from the step S278 to a step S279.

Accordingly, in the case where indicators are successively detected by the step S274, the order number "n" is periodically incremented and blocks containing the respective detected indicators are sequentially decoded by the step S276. When the step S278 does not detect the existence of a further block, the program advances to the step S279.

The step S279 combines the recovered contents of the respective blocks. The step S279 may combine the recovered contents of specified ones of the blocks. It should be noted that the step S279 may be omitted. After the step S279, the program advances to the step S150 (see FIG. 10).

The error correction process implemented in the subroutine S140 of FIG. 10 provides information representing an error position or positions corresponding to a block or blocks each being an erroneous object to be corrected. The error positional information will be used in the routine S160 for determining whether the subject ticket is genuine or counterfeit.

Figure 14:
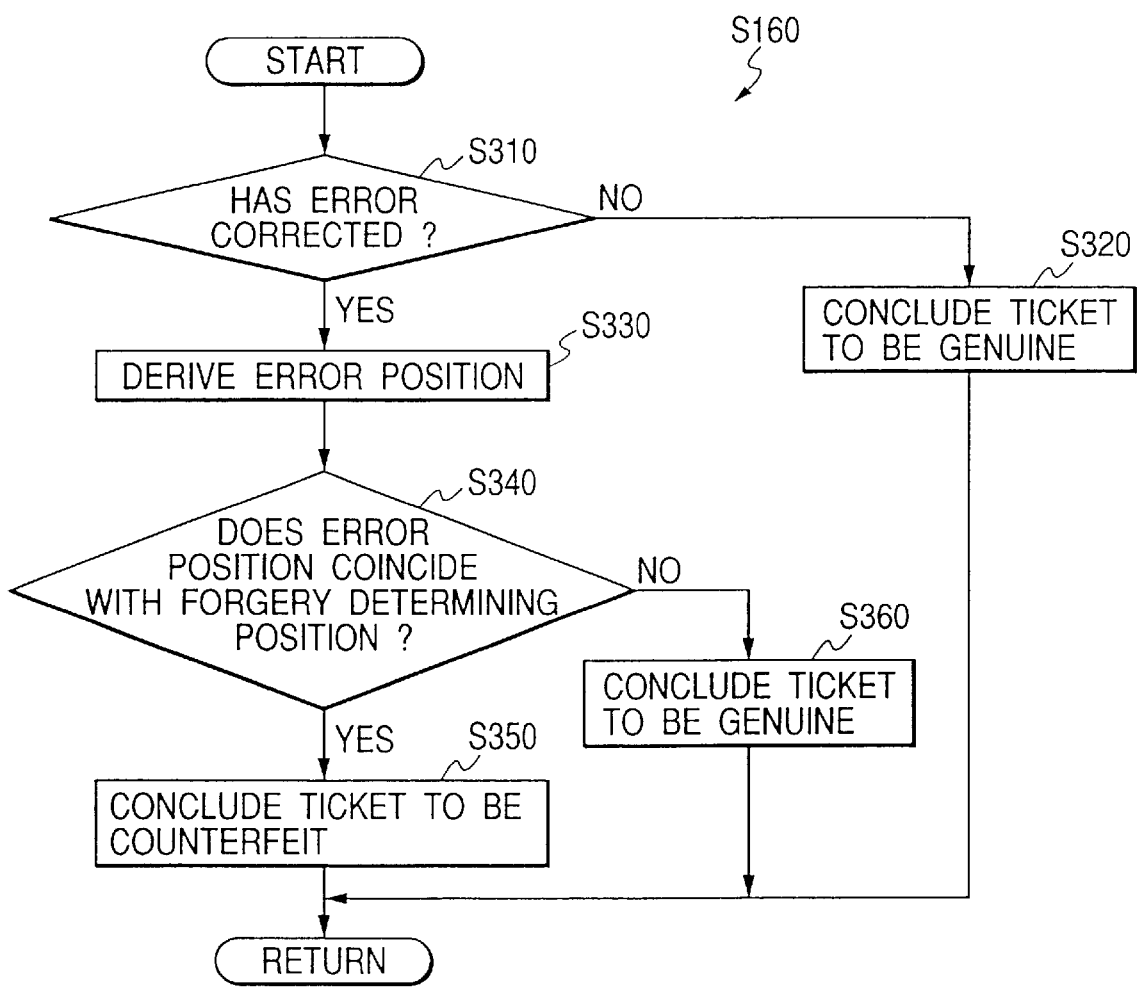
FIG. 14 is a flowchart of a second subroutine in FIG. 10.

As shown in FIG. 14, the subroutine S160 includes a step S310 which follows the step S150 (see FIG. 10). The step S310 determines whether or not at least one error has been corrected by the error correction process in the subroutine S140. When the step S310 determines that at least one error has been corrected by the error correction process, the program advances from the step S310 to a step S330. Otherwise, the program advances from the step S310 to a step S320.

The step S320 concludes the subject ticket to be genuine. The step S320 stores a signal of the corresponding conclusion into the RAM within the control portion 11. The contents of the conclusion-representing signal will be inspected by the step S170 (see FIG. 10) to confirm the result of the process by the subroutine S160. After the step S320, the program advances to the step S170 (see FIG. 10).

The step S330 retrieves the error positional information. The step S330 derives an error position (an erroneous-block position) from that information.

A step S340 following the step S330 determines whether or not the derived error position coincides with a reference position designated as a forgery determining position. In other words, the step S340 determines whether or not the erroneous-block position is equal to a designated-block position. The reference position (the forgery determining position or the designated-block position) agrees with a specified place where the area of a QR code and a portion of a special-ink stripe overlap each other. When the step S340 determines that the erroneous-block position is equal to the designated-block position, the program advances from the step S340 to a step S350. Otherwise, the program advances from the step S340 to a step S360.

The step S350 concludes the subject ticket to be counterfeit. The step S350 stores a signal of the corresponding conclusion into the RAM within the control portion 11. The contents of the conclusion-representing signal will be inspected by the step S170 (see FIG. 10) to confirm the result of the process by the subroutine S160. After the step S350, the program advances to the step S170 (see FIG. 10).

The step S360 concludes the subject ticket to be genuine. The step S360 stores a signal of the corresponding conclusion into the RAM within the control portion 11. The contents of the conclusion-representing signal will be inspected by the step S170 (see FIG. 10) to confirm the result of the process by the subroutine S160. After the step S360, the program advances to the step S170 (see FIG. 10).

The reading apparatus 1 of FIG. 6 detects forged tickets as follows. Consideration will be given of a first forged admission ticket which is made by copying a genuine admission ticket 50 by a usual copying machine. The first forged ticket lacks special-ink stripes 51. Therefore, the figure-pattern-corresponding signal outputted from the special-ink sensing unit 30 reflects the absence of special-ink stripes 51 from the subject ticket. Thus, in the case where the subject ticket is a first forged ticket, the step S130 (see FIG. 10) executed by the control portion 11 in the optical information reading unit 10 determines that special-ink stripes are not provided on the predetermined positions of the subject ticket. In addition, the step S130 concludes the subject ticket to be counterfeit. In this case, the step S130 is followed by the step S180 (see FIG. 10) which outputs a warning signal to the management apparatus via the communication interface 13. The management apparatus holds the admission gate closed and activates the buzzer in response to the warning signal to notify the clerk in charge that the subject ticket is counterfeit.

Figure 15:
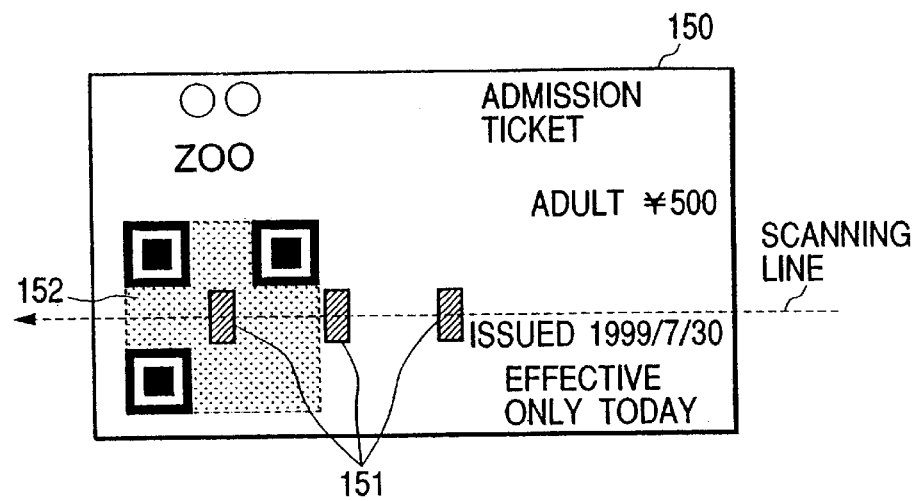
FIG. 15 is a diagrammatic plan view of a forged admission ticket.

FIG. 15 shows a second forged admission ticket 150 made by changing the first forged admission ticket as follows. Portions, which contain parts of special-ink stripes 51, are cut from a used genuine admission ticket (a spent genuine admission ticket). Those portions 151 are stuck to given areas of the first forged ticket which will be scanned by the special-ink sensing unit 20. Thus, the first forged ticket is changed into a second forged ticket. As shown in FIG. 15, left-hand one of the stuck portions 151 covers a part of a QR code 152 on the second forged admission ticket. The covered part is in a specified place where the area of a QR code 52 and a portion of a special-ink stripe 51 overlap each other in the case of a genuine admission ticket 50. When the subject ticket is a second forged ticket, the covered part of a QR code on the subject ticket is detected as an erroneous part. In this case, the step S340 executed by the control portion 11 in the optical information reading unit 10 determines that the derived error position coincides with the specified place. Then, the step S340 is followed by the step S350 which concludes the subject ticket to be counterfeit.

Second Embodiment

A second embodiment of this invention is similar to the first embodiment thereof except for design changes mentioned hereinafter. A step S350 (see FIG. 14) in the second embodiment of this invention is modified to conclude that a subject ticket may be counterfeit. After the step S350, an additional step is executed instead of the step S180 (see FIG. 10). The additional step outputs an attention signal to a management apparatus via a communication interface 13 (see FIG. 7). In response to the attention signal, the management apparatus urges a clerk in charge to check the subject ticket.

Third Embodiment

A third embodiment of this invention is similar to the first embodiment thereof except for design changes mentioned hereinafter. In the third embodiment of this invention, a white-black pattern (a bright-dark pattern) of cells regenerated on the basis of the decoding-resultant contents of a QR code and the information of the recording format of the QR code is used as a first pattern. On the other hand, a white-black pattern of cells in an optically read QR code (a before-decoding QR code or a captured QR code) is used as a second pattern. The first pattern and the second pattern are compared to each other to detect an error position or positions.

Figure 16:
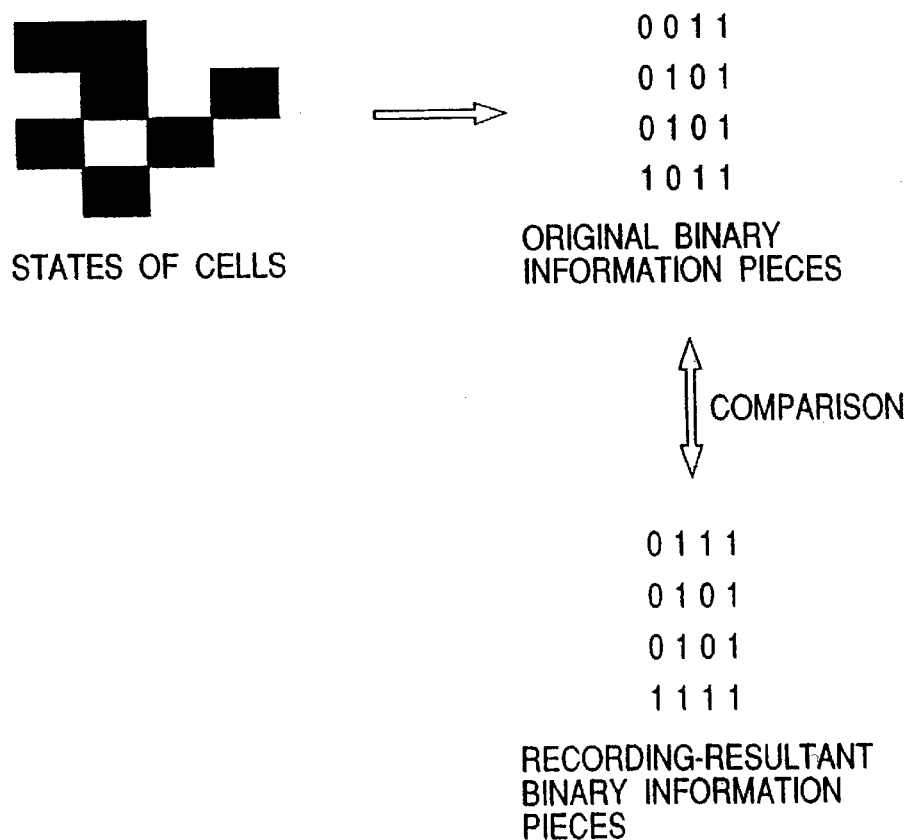
FIG. 16 is a diagram of the states of cells in a certain part of a QR code, the states of original binary information pieces, and the states of decoding-resultant binary information pieces.

It is assumed that the states of cells in a certain part of a captured image of a QR code are in a pattern of FIG. 16. Original binary information pieces in FIG. 16 are generated from the states of these cells. Specifically, every black cell is assigned to an information piece of "0" while every white cell is assigned to an information piece of "1". The decoding process including the error correction process converts the original binary information pieces into decoding-resultant binary information pieces in FIG. 16. The original binary information pieces and the decoding-resultant binary information pieces are compared to detect an error position or positions. In FIG. 16, the binary information piece in the second column and the fourth row is detected as an error position.

Fourth Embodiment

Figure 17:
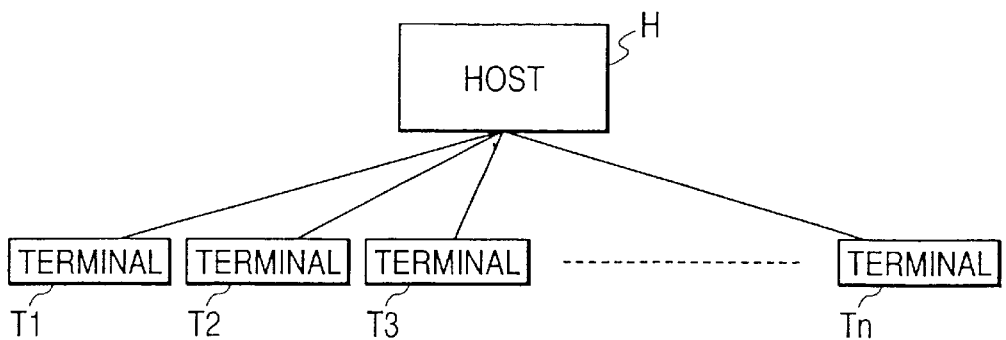
FIG. 17 is a block diagram of a system including a host apparatus and terminal apparatuses according to a fourth embodiment of this invention.

FIG. 17 shows a fourth embodiment of this invention which is similar to the first embodiment thereof except for design changes mentioned hereinafter. As shown in FIG. 17, the fourth embodiment of this invention includes a host apparatus H and terminal apparatuses T1, T1, T2, . . . , and Tn. The terminal apparatuses T1–Tn may be replaced by only one terminal apparatus. The terminal apparatuses T1–Tn are connected to the host apparatus H. The terminal apparatuses T1–Tn can communicate with the host apparatus H. Reading and decoding a two-dimensional code are executed by the terminal apparatuses T1–Tn. On the other hand, a process of determining whether a subject ticket is genuine or counterfeit is executed by the host apparatus H. Detection of an error position or positions is executed by the terminal apparatuses T1–Tn or the host apparatus H. Preferably, detection of an error position or positions is executed by the terminal apparatuses T1–Tn.

Figure 18:
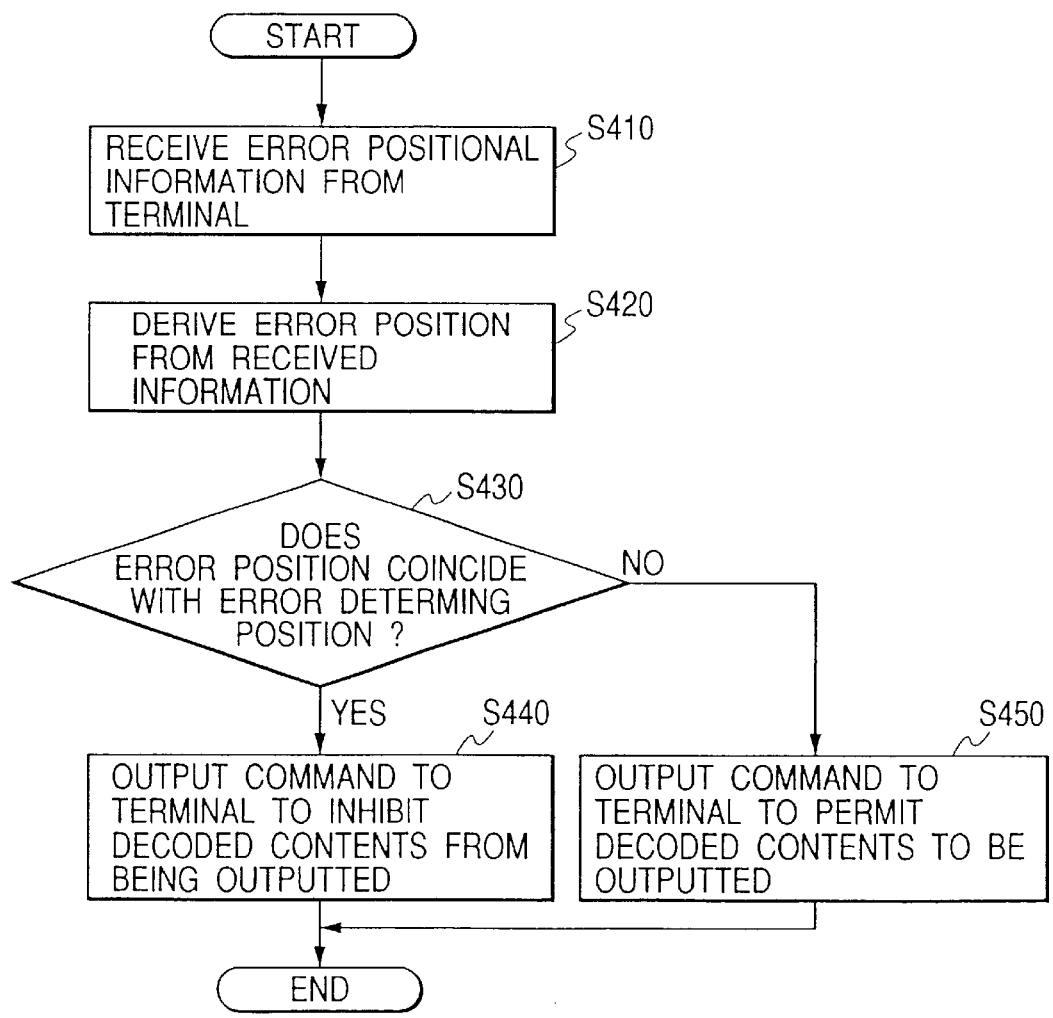
FIG. 18 is a flowchart of a segment of a program for the host apparatus in FIG. 17.

The host apparatus H includes a computer which operates in accordance with a program stored in a memory. FIG. 18 is a flowchart of a segment of the program. As shown in FIG. 18, a first step S410 of the program segment receives error positional information from the terminal apparatuses T1–Tn.

A step S420 following the step S410 derives an error position (an erroneous-block position) from the error positional information.

A step S430 subsequent to the step S420 determines whether or not the derived error position coincides with a reference position designated as a forgery determining position. In other words, the step S430 determines whether or not the erroneous-block position is equal to a designated-block position. The reference position (the forgery determining position or the designated-block position) agrees with a specified place where the area of a QR code and a portion of a special-ink stripe overlap each other. When the step S430 determines that the erroneous-block position is equal to the designated-block position, the program advances from the step S430 to a step S440. Otherwise, the program advances from the step S430 to a step S450.

The step S440 concludes a subject ticket to be counterfeit. The step S440 outputs a command signal to the terminals T1–Tn to inhibit decoding-resultant contents from being outputted. After the step S440, the current execution cycle of the program segment ends.

The step S450 concludes the subject ticket to be genuine. The step S440 outputs a command signal to the terminals T1–Tn to permit decoding-resultant contents to be outputted. After the step S450, the current execution cycle of the program segment ends.

Fifth Embodiment

A fifth embodiment of this invention is similar to the first embodiment thereof except for design changes mentioned hereinafter. In the fifth embodiment of this invention, only one special-ink stripe 51 is provided on an admission ticket 50. A portion of the special-ink stripe 51 overlaps the area of a two-dimensional code 52 on the ticket 50.

Sixth Embodiment

A sixth embodiment of this invention is similar to the first embodiment thereof except for design changes mentioned hereinafter. In the sixth embodiment of this invention, special-ink stripes 51 are slant with respect to the edge lines of an admission ticket 50. Preferably, a subject ticket is scanned by a special-ink sensing unit 30 along a plurality of scanning lines.

Seventh Embodiment

A seventh embodiment of this invention is similar to the first embodiment thereof except for design changes mentioned hereinafter. In the seventh embodiment of this invention, the magnetic ink in the special ink is replaced by ink which modulates a specified wavelength.

Eighth Embodiment

An eighth embodiment of this invention is modified from the first embodiment thereof to handle a medium rather than an admission ticket 50. An information-representing code such as a two-dimensional code or a QR code is printed on the medium. Examples of the medium are a lottery ticket, a passenger ticket, and a merchandise coupon.

What is claimed is:

1. A method of determining whether or not a medium on which a two-dimensional code and a predetermined figure pattern are printed is counterfeit, wherein an error in the two-dimensional code is correctable during decoding of the two-dimensional code, and a cell position corresponding to a position of the error is detectable, the predetermined figure pattern being made of special ink, the two-dimensional code and the predetermined figure pattern overlapping each other at a specified place in the medium, the method comprising:

optically reading the two-dimensional code from the medium;

decoding the two-dimensional code which has been optically read for obtaining decoding results, wherein the decoding of the two-dimensional code includes performing an error correction process on the decoding results and detecting an error correction position that is the position of the error and the cell position corresponding to the position of the error when an error is detected in the decoding results;

determining whether or not the detected error correction position is in the specified place; and judging whether or not the medium is counterfeit in response to a result of the determining of whether or not the detected error correction position is in the specified place.

2. A method as recited in claim 1, wherein cells composing the two-dimensional code are grouped into blocks, and arrangement information representing arrangement of the cells in the blocks is recorded in the two-dimensional code and the error correction position is detected on the basis of the arrangement information.

3. A method as recited in claim 1, wherein the performing of the error correction process comprises:

comparing a bright-dark cell pattern indicated by cells regenerated on the basis of results of the decoding of the two-dimensional code and information of a recording format of the two-dimensional code with a bright-dark cell pattern indicated by the optically-read two-dimensional code; and detecting the error correction position in response to a result of the comparing.

4. A method as recited in claim 1, further comprising:

causing a sensor to scan the specified place, the sensor being able to sense the special ink;

determining whether the special ink is present in or absent from the specified place in response to an output signal of the sensor; and concluding the medium to be counterfeit when it is determined that the special ink is absent from the specified place.

5. An apparatus for determining whether or not a medium on which a two-dimensional code and a predetermined figure pattern are printed is counterfeit, wherein an error in the two-dimensional code is correctable during decoding of the two-dimensional code, and a cell position corresponding to a position of the error is detectable, the predetermined figure pattern being made of special ink, the two-dimensional code and the predetermined figure pattern overlapping each other at a specified place in the medium, the apparatus comprising:

reading means for optically reading bright-dark conditions of respective cells composing the two-dimensional code on the medium;

decoding means for decoding the two-dimensional code on the basis of the optically-read bright-dark conditions of the cells;

error-correction-position detecting means for, in cases where error correction is executed during the decoding of the two-dimensional code, detecting an error correction position corresponding to a the cell position having the error;

determining means for determining whether or not the detected error correction position is in the specified place; and judging means for judging whether or not the medium is counterfeit in response to a result of the determining by the determining means.

6. An apparatus as recited in claim 5, wherein cells composing the two-dimensional code are grouped into blocks, and arrangement information representing arrangement of the cells in the blocks is recorded in the two-dimensional code, and wherein the error-correction-position detecting means comprises means for detecting the error correction position on the basis of the arrangement information.

7. An apparatus as recited in claim 5, wherein the error-correction-position detecting means comprises:

comparing means for comparing a bright-dark cell pattern indicated by cells regenerated on the basis of results of the decoding of the two-dimensional code and information of a recording format of the two-dimensional code with a bright-dark cell pattern indicated by the optically-read two-dimensional code; and detecting means for detecting the error correction position in response to a result of the comparing.

8. An apparatus as recited in claim 5, further comprising at least one host and a plurality of terminals, wherein the reading means, the decoding means, and the error-correction-position detecting means are provided in the terminals, and wherein the determining means and the judging means are provided in the host, and the terminals inform the host of the error correction position.

9. An apparatus as recited in claim 7, further comprising at least one host and a plurality of terminals, wherein the reading means and the decoding means are provided in the terminals, wherein the error-correction-position detecting means, the determining means, and the judging means are provided in the host, wherein the terminals notify the host of the results of the decoding and the information of the recording format of the two-dimensional code.

10. An apparatus as recited in claim 5, further comprising:

a sensor for sensing the special ink;

means for causing the sensor to scan the specified place;

means for determining whether the special ink is present in or absent from the specified place in response to an output signal of the sensor; and means for concluding the medium to be counterfeit when it is determined that the special ink is absent from the specified place.

11. A computer readable medium loaded with a computer program corresponding to the method in one of claims 1 to 4.

* * * * *